Figure 1:
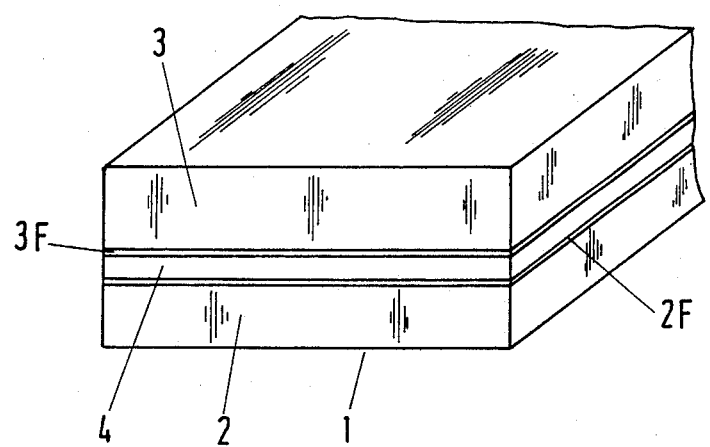

United States Patent [19]

Steinleitner et al.

[11] Patent Number: 4,927,475
[45] Date of Patent: May 22, 1990

[54] PROCESS FOR JOINING METALLIC AND CERAMIC MATERIALS

[75] Inventors: Günther Steinleitner, Schriesheim; Philipp Roze, Wiesloch-Baiertal, both of Fed. Rep. of Germany

[73] Assignee: Asea Brown Boveri Aktiengesellschaft, Mannheim, Fed. Rep. of Germany

[21] Appl. No.: 265,147

[22] Filed: Oct. 31, 1988

[30] Foreign Application Priority Data

Oct. 30, 1987 [DE] Fed. Rep. of Germany ....... 3736843

[51] Int. Cl.$^5$ .............................................. B32B 18/00
[52] U.S. Cl. ......................................... 156/89; 501/4; 501/14; 501/17; 501/65; 501/77
[58] Field of Search .......................... 156/89, 326, 329; 501/4, 14, 17, 65, 77; 228/122, 123, 903

[56] References Cited

U.S. PATENT DOCUMENTS

| | | | |
|---|---|---|---|
| 2,771,969 | 11/1956 | Brownlow | 156/89 |
| 3,175,937 | 3/1965 | Bayer | 156/89 |
| 3,284,891 | 11/1966 | Whitney | 156/89 |
| 3,676,292 | 7/1972 | Pryor et al. | 156/89 |

*Primary Examiner*—Caleb Weston
*Attorney, Agent, or Firm*—Herbert L. Lerner; Laurence A. Greenberg

[57] ABSTRACT

A process for joining components having ceramic and metallic joining surfaces provides a permanent and complete joint with ceramic surfaces despite metal-oxide layers on the metal or metal-alloy joining surfaces. A glass coating is applied to the ceramic joining surface before joining. The glass contains at least 5 to 20% by weight of $Na_2O$, 30 to 60% by weight of $B_2O_3$ and 20 to 60% by weight of $SiO_2$. The surfaces of the components to be joined are then permanently joined to each other at a specified temperature and a specified pressure.

2 Claims, 2 Drawing Sheets

PROCESS FOR JOINING METALLIC AND CERAMIC MATERIALS

The invention relates to a process for joining ceramic and metallic materials.

Metallic and ceramic materials, as well as the components produced therefrom, find a wide field of application in engineering. However, the materials are not only used separately from each other. On the contrary, there is frequently the need to permanently join both materials or components formed of both materials to each other. An example of this are storage cells which have a solid ceramic electrolyte. In order to effect an insulation of the solid electrolyte relative to metallic components, the former is jointed to a ceramic insulating ring which in turn must be joined to a metallic component for sealing the storage cell.

Such an electrochemical storage cell is known from German Published, Non-Prosecuted Application DE-OS No. 30 33 438. In this case, the insulating ring of the solid electrolyte, which is manufactured from alpha aluminum oxide, is joined through an aluminum ring to the metallic sealing element of the storage cell by thermal compression. In this case a disadvantageous effect arises from the fact that an oxide layer forms on metallic components or metal-alloy components when exposed to oxygen, unless they are manufactured from gold or platinum, even small quantities of the latter being sufficient. The formation of such an oxide layer is particularly marked in the case of soft metals, such as aluminum and lead, which are used, in particular, for joining ceramic structural members. Although the oxide layer is pulled apart under the influence of pressure and heat during the joining of ceramic and metallic structural components or corresponding layers which are applied to structural members made of other materials, it nevertheless remains intact in the interfaces between the ceramic and metallic material. As a result of this, a cohesive joint between the surfaces to be joined to each other is prevented since no reactions take place between the metallic and ceramic material in the regions in which the oxide layers remain intact. Such a joint cannot completely fulfill the requirements imposed upon it with regard to strength, imperviousness and corrosion resistance.

It is accordingly an object of the invention to provide a process for joining metallic and ceramic materials, or components of the materials, which overcomes the hereinafore-mentioned disadvantages of the heretofore-known methods of this general type.

With the foregoing and other objects in view there is provided, in accordance with the invention, a process for joining ceramic and metallic materials, which comprises at least partially coating or coating some regions of a joining surface of a ceramic material with a glass coating, subsequently connecting the joining surface of the ceramic material to the joining surface of a metallic material, and subsequently joining the two joining surfaces during a pressure and heat treatment.

With the objects of the invention in view, there is also provided a process for producing an electrochemical storage cell based on sodium and sulphur, which comprises placing a beaker-shaped solid electrolyte with an open upper end in a metallic housing defining an anode space and a cathode space in the metallic housing mutually separated by the solid electrolyte, placing a glass coating on at least one joining surface of an insulating ring formed of alpha aluminum oxide, subsequently placing the insulating ring at the open upper end of the solid electrolyte with an outward orientation, and permanently joining sealing elements to the insulating ring directly over the glass coating.

As a result of applying a coating of glass which has a specified thickness as well as a coefficient of thermal expansion which differs only slightly from the coefficient of thermal expansion of the ceramic material, a joint which is improved by a factor of 5 to 10 compared with conventional joints can be provided between ceramic and metallic materials or components made of the materials. This joint is achieved, in particular, by the metallic oxide which is formed on the metallic surfaces or the metal-alloy surfaces being dissolved in the glass when joining the components under pressure and heat. The interfering oxide layers which have heretofore prevented a complete joining of the ceramic and metal surfaces are consequently eliminated. The process according to the invention can be used to produce joints which have the desired mechanical strength, as well as the desired imperviousness to gases and the necessary chemical resistance.

According to the invention, it is possible to use this process to join the insulating ring of a solid electrolyte which separates the reactant spaces in a sodium/sulphur storage cell to a metal sealing element, in such a manner that a permanent sealing of the storage cell is assured over the entire service life of the same.

In accordance with another mode of the invention, there is provided a process which comprises selecting the glass coating in the form of a material with a coefficient of thermal expansion differing from the coefficient of thermal expansion of the joining surface of the ceramic material by at most $+/-20\%$ and preferably $+/-10\%$.

In accordance with a further mode of the invention, there is provided a process which comprises selecting the glass coating in the form of a material with a transformation point below the temperature of the heat treatment.

In accordance with an added mode of the invention, there is provided a process which comprises selecting the glass coating in the form of a material with a thickness between 0.1 and 100 $\mu$m and preferably between 1 and 10 $\mu$m.

In accordance with an additional mode of the invention, there is provided a process which comprises selecting the glass coating in the form of a material containing 5 to 20% by weight of sodium oxide, 30 to 60% by weight of boron oxide and 20 to 60% by weight of silicon oxide. A preferred glass composition contains 12% by weight of sodium oxide, 48% by weight of boron oxide as well as 40% by weight of silicon oxide, based on the total weight per $cm^2$ of glass quantity applied.

In accordance with yet another mode of the invention, there is provided a process which comprises performing the step of coating the joining surface of the ceramic material or the insulating ring by applying a sol solution containing organic sodium, boron and silicon compounds dissolved in water or alcohol to the joining surface of the ceramic material by immersion or spraying, evaporating the solvent at a temperature between 500° and 1,000° C. to form the coating, and permanently connecting the coating to the joining surface of the ceramic material or the insulating ring. The organic compounds may be dissolved in a propanol. The solvent is removed by a heat treatment, the desired glass compound being established as a result of exposure to atmospheric oxygen.

In accordance with a concomitant mode of the invention, there is provided a process which comprises carrying out the step of joining the two joining surfaces at a temperature of at least 0.8. $T_m$ and a pressure of at least 10 MPa, wherein $T_m$ is the melting point in K of the joining surface of the metallic material, and maintaining the pressure and heat treatment for a time period of at least from several seconds to minutes. The metallic material may be a metal or metal alloy.

Other features which are considered as characteristic for the invention are set forth in the appended claims.

Although the invention is illustrated and described herein as embodied in a process for joining metallic and ceramic materials, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

Figure 2:
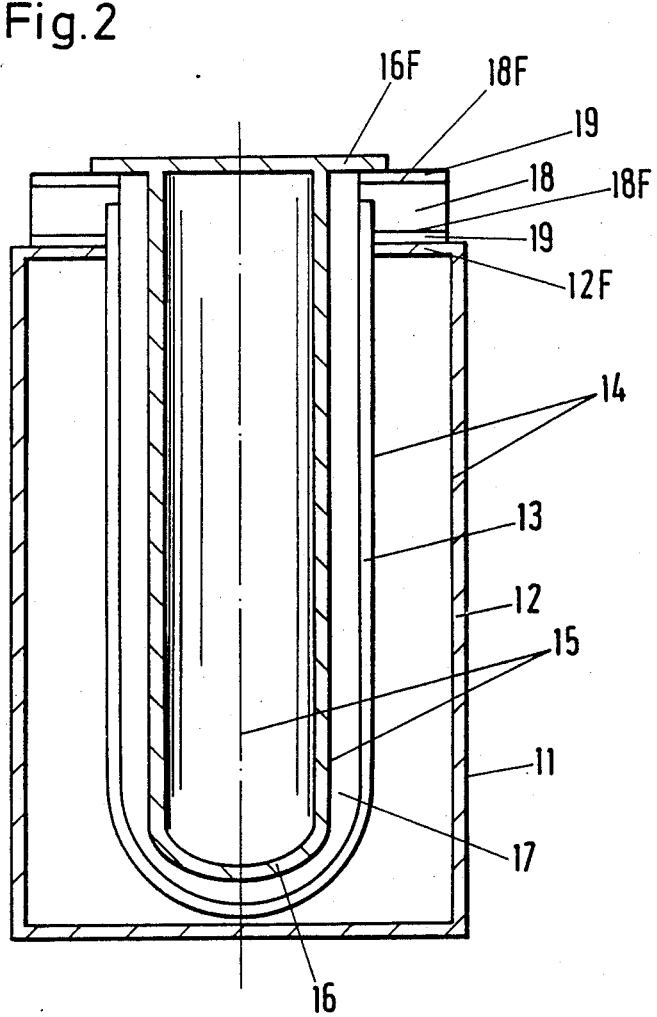

FIG. 1 is a fragmentary, diagrammatic, perspective view of a structural member made by joining together a ceramic and a metallic component; and FIG. 2 is a sectional view of an electrochemical storage cell.

Referring now to the figures of the drawing in detail and first, particularly, to FIG. 1 thereof, there is seen a region of a structural member 1 formed by two components 2 and 3 which are joined together. The component 2 is manufactured from ceramic, whereas the component 3 is produced from a metal or a metal alloy. In the illustrated embodiment used as an example, the component 3 is manufactured from aluminum. In order to be able to join the two components 2 and 3 together according to the invention, a glass coating 4 is applied to a surface 2F of the component 2 which is to be joined permanently to a surface 3F of the component 3. The essential constituents of the contents of the glass are 12% by weight of sodium oxide, 48% by weight of boron oxide, as well as 40% by weight of silicon oxide. The coating of the component 2 is first formed by means of a sol solution. For this purpose organic compounds of sodium, boron and silicon are dissolved in water or alcohol. Preferably, sodium methylate as well as boron methylate and silicon methylate are used to form the sol. Propanol is preferably used as a solvent. The proportions of alcoholates and solvent are chosen in such a way that the coating 4 subsequently has the desired glass composition. The surface 2F of the component 2 which is to be joined is coated with the sol by immersion or spraying in such a manner that a coating 4 having a thickness between 0.1 and 100 μm, and preferably between 1 and 10 μm is later obtained. In the illustrated embodiment used as an example, the coating 4 has a thickness of 10 μm. After coating the surface of the component 2 with the sol, the component is subjected to a heat treatment at a temperature between 500° and 1,000° C. in order to evaporate the solvent and to pyrolyze the organic constituents of the sol. At the same time, the glass which forms is burnt into the surface of the ceramic material. After the heat treatment, the desired glass coating 4 remains behind on the surface 2F of the component 2 and has the required thickness as well as the desired composition. The component 3 is then placed on the coating 4. In order to join the two components 2 and 3, they are then exposed to a specified temperature and a specified pressure. The temperature is above 500° C. and the pressure is at least 10 MPa. This pressure and heat treatment is maintained for a period of from a few seconds to minutes. During this time, the two components are permanently joined together over the entire surfaces 2F and 3F thereof which are to be joined together. Any oxide layers which have formed on the surface 3F of the component 3 are dissolved in the glass coating 4 so that a complete joining of the surfaces 2F and 3F placed on top of each other is possible. After the pressure and heat treatment, the structural member 1 is finished. The joining of aluminum and ceramic described above may also be carried out with other metal alloys or metals and ceramic materials. The glass composition for the coating 4 should always contain 5 to 20% by weight of sodium oxide, 30 to 60% by weight of boron oxide and 20 to 60% by weight of silicon oxide. In order to produce joining, the temperature should be at least 0.8. $T_m$, with $T_m$ being the melting point in K of the metallic joining surface 3F. The pressure during joining should be at least 10 MPa and should be maintained for a period of from a few seconds to minutes along with the above-mentioned temperature.

A specific application of the process according to the invention is explained with reference to an electrochemical storage cell 11 shown in FIG. 2. The cell 11 is bounded in the outward direction by a beaker-shaped housing 12 within which a solid electrolyte 13 that also has a beaker shape, is disposed. The dimensions of the solid electrolyte 13 are chosen in such a way that a continuous gap 14 remains between the outer surfaces of the solid electrolyte 13 and the inner surfaces of the housing 12 and acts as cathode space. The interior of the solid electrolyte 13 is used as an anode space 15. A cartridge 16 which contains sodium is inserted into the solid electrolyte 13. The sodium flows out of a non-illustrated opening at the bottom of the cartridge into a gap 17 between the cartridge 16 and the inner surface of the solid electrolyte 13. An outwardly directed insulating ring 18 which serves as a flange is glazed on to the upper open end of the solid electrolyte 13. In the illustrated embodiment of the storage cell 11 used as an example, the insulating ring 18 is manufactured from alpha aluminum oxide. A glass coating 19 is applied to each of the upper and lower joining surfaces 18F of the insulating ring 18. The glass has a composition of 12% by weight of $Na_2O$, 48% by weight of $B_2O_3$ as well as 40% by weight of $SiO_2$. The coatings 19 are applied to the insulating ring 18 and formed in the same manner as is described above for the structural element 1 shown in FIG. 1. After glazing the insulating ring 18 onto the solid electrolyte 13, the housing 12 is permanently joined to the insulating ring 18.

In the illustrated embodiment used as an example, the housing 12 is manufactured from aluminum and has an inwardly directed flange 12F at the upper open end thereof serving as a sealing element. The insulating ring 18 of the solid electrolyte 3 is placed on the flange 12F. The cartridge 16 disposed in the solid electrolyte 13 has a flange 16F which is directed outwardly and also serves as a sealing element. The length of the flange 16F is dimensioned in such a way that it projects outwardly over the upwardly directed edge of the solid electrolyte 13 and is continued approximately to the center of the insulating ring 18. The flange 16F of the cartridge 16 is manufactured from a metal which is a good conductor of the electrical current and which is additionally resistant to the corrosive effects of sodium. This is necessary, in particular, since the gap 17 is gas-tightly sealed in an outward direction with the aid of the flange 16F.

The flange 12F of the housing 12 and the flange 16F of the cartridge 16 are permanently joined to the insulating ring 18 of the solid electrolyte by thermal compression. As a result of the coatings 19 disposed on the upper and lower surfaces of the insulating ring 18, metal oxides which have formed on the upper or lower surfaces of the flanges 12F and 16F are dissolved in the coatings 19 during the step of joining to the insulating ring 18. As a result of this process, a permanent joint between the insulating ring 18 and the flanges 12F and 16F is achieved.

The foregoing is a description corresponding in substance to German Application No. P 37 36 843.5, dated Oct. 30, 1987, the International priority of which is being claimed for the instant application, and which is hereby made part of this application. Any material discrepancies between the foregoing specification and the aforementioned corresponding German application are to be resolved in favor of the latter.

We claim:

1. A process for joining ceramic to metallic materials which comprises the steps of coating a portion of the ceramic material at the area of the joining surface with a glass coating, juxtaposing the coating portion with the joining area portion of the metallic material to be joined, then consolidating the juxtaposed areas into a joint by the application of a combined pressure and heat treatment:

wherein said glass coating for said ceramic material is selected from the group of glasses having coefficients of thermal expansion with the range of ±10% of the thermal expansion coefficients of said ceramic substrate material and said glass having a transformation point below the heat treatment temperature, said glass for said coating being selected from the group consisting of glasses containing 5 to 20 wt. % of sodium oxide, 30–60 wt. % of boron oxide and 20 to 60 wt. % of silica; said coating being applied to said ceramic substrate at the joining area to a thickness of from 1 to 10 μm; and said temperature and pressure heat-treatment conditions for said ceramic to said metal consolidation are temperatures of at least $0.8 \cdot T_m$ and a pressure of at least 10 Mpa, wherein $T_m$ is the melting point in °K. of the glass juxtaposed between said ceramic and metallic materials; said heat treatment time being sufficient for consolidation at said joining surfaces of said ceramic and metallic materials by said interposed glass.

2. The process according to claim 1, which comprises performing the step of glass coating the joining surface of the ceramic material which comprises forming said glass in situ by the steps of spraying or immersing a sol solution containing organic sodium, boron and silicon compounds in the proportions of the oxide components of said glass, dissolved in water or alcohol to the joining surface of the ceramic material, by evaporating the solvent at a temperature between 500° and 1,000° C. to form the glass, and thus permanently affixing the glass coating to the joining surface areas of the ceramic material.

* * * * *